United States Patent
Yamazaki

(10) Patent No.: US 9,509,658 B2
(45) Date of Patent: Nov. 29, 2016

(54) METHOD OF RESTORING A MAC ADDRESS AND RECORDING MEDIUM

(71) Applicant: FUJITSU LIMITED, Kawasaki-shi, Kanagawa (JP)

(72) Inventor: Masanori Yamazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 14/527,952

(22) Filed: Oct. 30, 2014

(65) Prior Publication Data
US 2015/0131656 A1    May 14, 2015

(30) Foreign Application Priority Data

Nov. 14, 2013    (JP) .................. 2013-235758

(51) Int. Cl.
*H04L 12/28*    (2006.01)
*H04L 29/12*    (2006.01)
*H04L 12/46*    (2006.01)

(52) U.S. Cl.
CPC ....... *H04L 61/2038* (2013.01); *H04L 12/4679* (2013.01); *H04L 61/2046* (2013.01); *H04L 61/6022* (2013.01)

(58) Field of Classification Search
CPC ........... H04L 61/2069; H04L 61/6022; H04L 61/2046; H04L 61/2038; H04L 12/4679
USPC ....................................... 370/390
See application file for complete search history.

(56) References Cited

U.S. PATENT DOCUMENTS

| 6,577,630 B1* | 6/2003 | Markwalter | H04L 12/462 370/392 |
| 2007/0247467 A1* | 10/2007 | Kaneda | G03G 15/5004 345/531 |
| 2012/0131225 A1* | 5/2012 | Chiueh | H04L 12/4633 709/246 |

FOREIGN PATENT DOCUMENTS

| JP | 10-135993 | 5/1998 |
| JP | 2007-89019 | 4/2007 |

\* cited by examiner

*Primary Examiner* — Sai-Ming Chan
(74) *Attorney, Agent, or Firm* — Fujitsu Patent Center

(57) ABSTRACT

A method of restoring a MAC address in system, the method includes, first transmitting a first frame, in which a origin of a transmission is a first MAC address held in the administration target machine, to the administration server, admitting a passage of a frame, in which the origin of the transmission is a MAC address included in a permission list, second transmitting a second frame, in which the origin of a transmission is the second MAC address, to the administration server, when not receiving a reply for the first frame from the administration server, replying a third frame which includes the regular first MAC address corresponding to the second MAC address, and restoring the first MAC address to the regular first MAC address included in the third frame and re-starting based on the first MAC address after restoration.

16 Claims, 14 Drawing Sheets

FIG. 7A  d1

| LOGICAL SERVER ID | D-MAC | ALLOTTED PHYSICAL SERVER ID |
|---|---|---|
| L1 | 01:00:00:00:00:01 | P5 |
| L2 | 01:00:00:00:00:02 | P1 |
| L3 | 01:00:00:00:00:03 | P2 |
| ... | ... | ... |

FIG. 7B  d2

| PHYSICAL SERVER ID | SW ID/port ID | U-MAC | D-MAC |
|---|---|---|---|
| P1 | 1/1 | 00:00:00:00:00:01 | 01:00:00:00:00:02 |
| P2 | 1/2 | 00:00:00:00:00:02 | 01:00:00:00:00:03 |
| P3 | 1/3 | 00:00:00:00:00:03 | ... |
| ... | ... | ... | ... |

METHOD OF RESTORING A MAC ADDRESS AND RECORDING MEDIUM

CROSS-REFERENCE TO RELATED APPLICATION

This application is based upon and claims the benefit of priority of the prior Japanese Patent Application No. 2013-235758, filed on Nov. 14, 2013, the entire contents of which are incorporated herein by reference.

FIELD

The embodiments discussed herein are related to a method of restoring a MAC address and recording medium.

BACKGROUND

A physical IaaS (Infrastructure as a Service) is a service that a service company rents physical servers which are installed in a data center to a user. The user accesses the physical server through an IP address (Internet Protocol address) which is assigned to the physical server, for example.

It is preferable to prepare the physical servers depending on the demand of the user in order to provide the service. However, because the users have a variety of demands, it causes to lose customers when system, which is met the demand of the user, is not provided. Therefore, it is preferable for the service company to have the physical servers from a high-performance physical server to a low cost physical server.

A technology of the physical IaaS provides physical servers by the pooling of hardware resources. The technology of the physical IaaS separates the hardware resources such as CPUs (Central Processing Unit), memories, and disk storage devices, etc. and pools the hardware resources. And the service company builds up the physical server by allocating (cutting and bringing) and assembling a hardware resource depending on the demand of the user from the pooled hardware resources. According to the physical IaaS, it is possible to flexibly constitute the physical server depending on the constitution requirements set by the user.

While, the physical server, which provides to the user, may be replaced due to trouble and maintenance. When the physical server is replaced, the MAC (Media Access Control) address to physically and uniquely correspond to the physical server is changed. Because user program has a possibility to use the MAC address, when the MAC address (called as physical MAC address) is changed, influence may produce to the service provided by the user (for example, a service provider). Therefore, a virtual MAC address, which is dynamically assigned, is provided to the user in behalf of the physical MAC address. By starting the physical server based on the virtual MAC address, even if the physical server is changed, it is avoided that the influence occurs for the service provided by the user.

It is disclosed in following patent documents 1 and 2 that the physical server has a plurality of MAC addresses.

[patent document 1] Japanese Laid-open Patent publication No. 2007-89019.

[patent document 2] Japanese Laid-Open Patent Publication No. Hei 10-135993.

SUMMARY

However, the virtual MAC address may be rewritten by the user by intention or a fault. The virtual MAC address in one server may duplicate with that in other servers by rewriting the virtual MAC address, because the MAC address has the need that is a unique on a network. In addition, it is difficult that the service company detects that the rewrite of the virtual MAC address occurred. Therefore, it is preferable to restore the virtual MAC address in a correct virtual MAC address when the rewrite of the virtual MAC address occurs.

According to a first aspect of the embodiment, a method of restoring a MAC address in system that a plurality of administration target machines connects with an administration server through a network communication device, the method includes, first transmitting a first frame, in which an origin of a transmission is a first MAC address held in the administration target machine, to the administration server, which stores a regular first MAC address corresponding to a second MAC address, by the administration target machine, through the network communication device, admitting a passage of a frame, in which the origin of the transmission is a MAC address included in a permission list which stores the regular first MAC address dynamically assigned to the administration target machine and the second MAC address uniquely assigned to the administration target machine for each of the plurality of administration target machines, by the network communication device, second transmitting a second frame, in which the origin of a transmission is the second MAC address held in the administration target machine, to the administration server, when not receiving a reply for the first frame from the administration server, by the administration target machine, replying a third frame which includes the regular first MAC address corresponding to the second MAC address in response to the second frame by the administration server, and restoring the first MAC address to the regular first MAC address included in the third frame in response to the third frame and re-starting based on the first MAC address after restoration by the administration target machine.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7A and FIG. 7B are diagrams explaining the logical server management DB d1 and the physical server management DB d2 of which the administration server 10 holds.

DESCRIPTION OF EMBODIMENTS (Physical IaaS)

Figure 1:
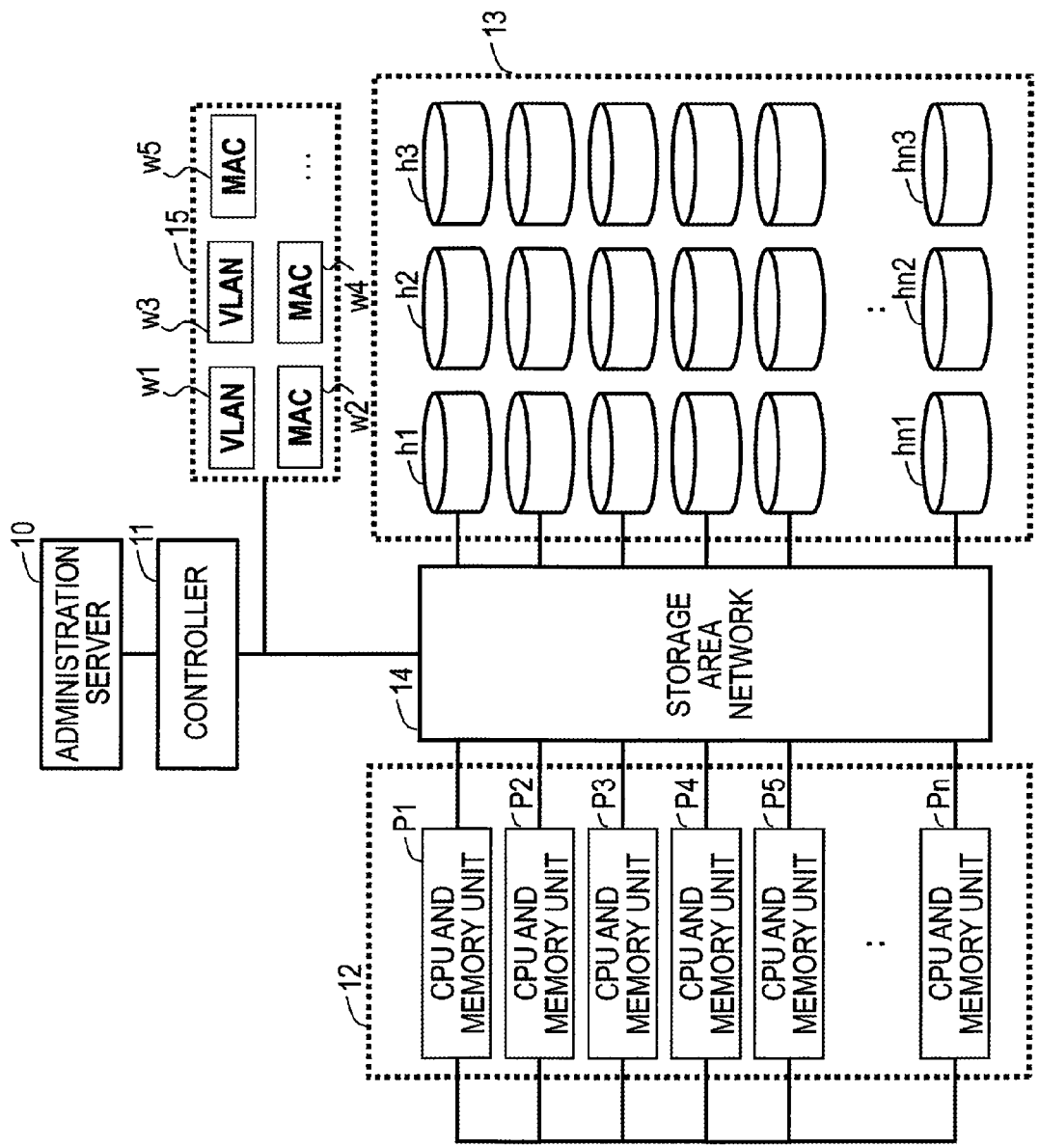
FIG. 1 is a block diagram illustrating hardware construction of the physical IaaS (Infrastructure as a Service).

FIG. 1 is a block diagram illustrating hardware construction of the physical IaaS (Infrastructure as a Service). The physical IaaS builds the physical server corresponding to the demand of the user based on resources pool management mechanism. In FIG. 1, the IaaS has an administration server 10, a controller 11, a storage area network 14 which is a high-speed interconnect, and resource pools 12, 13 and 15, for example. The controller 11 controls whole of the IaaS system. In addition, the administration server 10 executes resource pool management mechanism (programs) and performs the restoration process of the MAC address.

The resource pool illustrated by FIG. 1 has a CPU pool 12 having a plurality of system boards which is mounted a CPU (Central Processing Unit) and memory units P1-Pn, a disk pool 13 having a plurality of storage devices such as a HDD (Hard disk drive) and a network pool (memory in the controller) 15 having network resources such as setting information w1, w3 of the V-LAN (Virtual Local Area Network) and virtual MAC addresses w2, w4, w5.

The resource pool management mechanism of the administration server 10 connects the disk pool 13, which is accumulated a large number of storage devices h1-hn3, with the CPU and memory units P1-Pn in the CPU pool 12 by the storage area network 14. The storage devices h1-hn3, which are connected to the CPU and memory units P1-Pn by the storage area network 14, have a disk access performance as same as a local disk. Therefore, it is possible that the resources pool management mechanism provides a high-performance physical server to the user.

In addition, the resources pool management mechanism of the administration server 10 allocates (cuts and brings down) the hardware resources from the resource pools, and arranges OS (Operating System) and middleware program in the requirement depending on user's orders such as the number of CPUs and the number of HDDs, etc. and builds the physics server according to the requirement of the user. Therefore, it is possible that the resources pool management mechanism effectively and flexibly provides the physical server which adapts to the demand of the user to the user. In addition, it is possible that the resources pool management mechanism realizes the separation of hardware resources which are provided to the user, thereby it is possible to avoid the interference between users.

Figure 2:
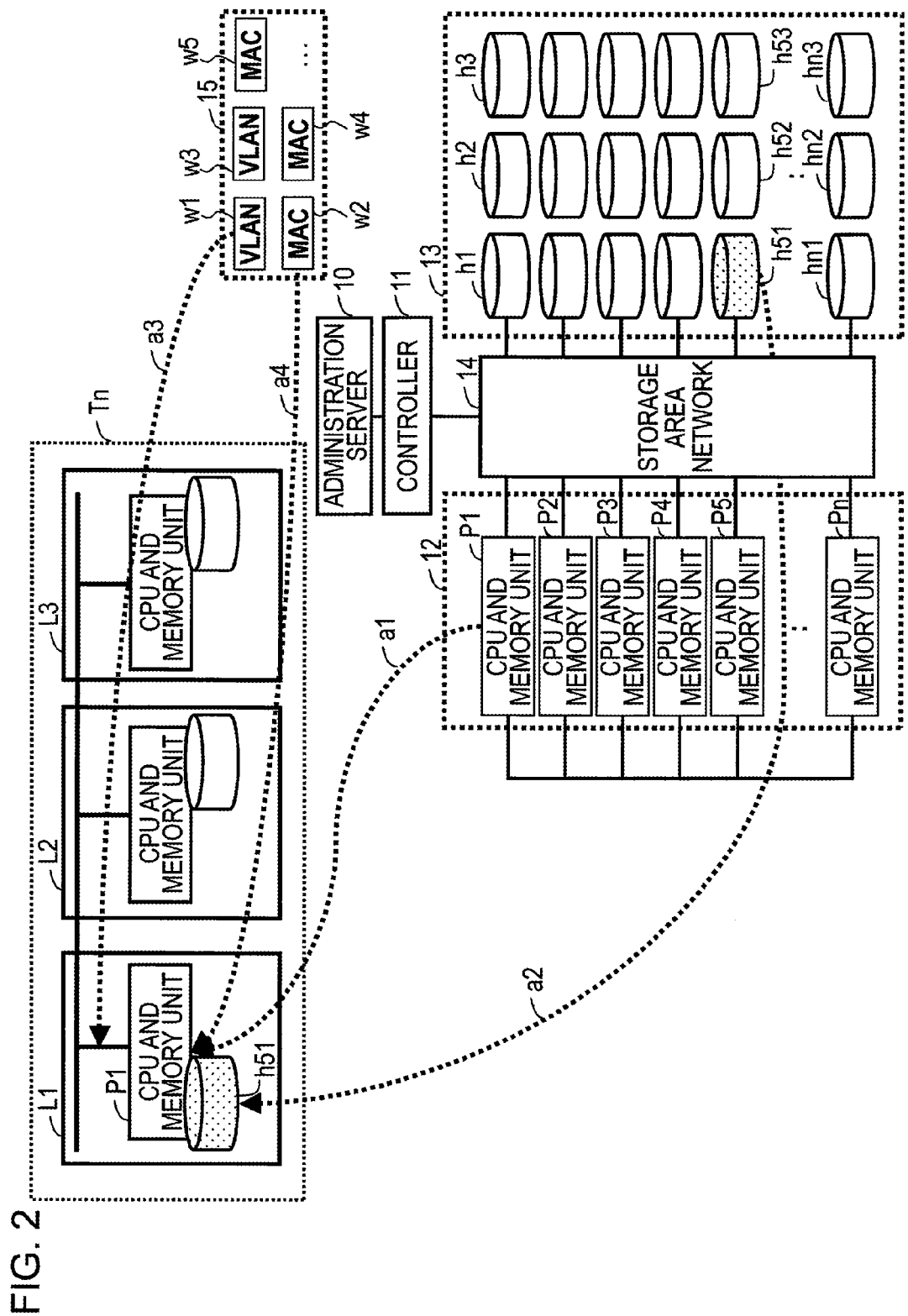
FIG. 2 is a diagram explaining a correspondence of the hardware resources which is provided to the user and the tenant by the resources pool management mechanism.

FIG. 2 is a diagram explaining a correspondence of the hardware resources which are provided to the user and the tenant by the resources pool management mechanism. In the embodiment, the set of hardware resources which is provided to the user is called as a tenant "Tn". In addition, for example, the combination of the CPU and memory unit and the storage device that tenant Tn has is called as a logical server.

In an example of FIG. 2, the tenant Tn has three logical servers L1-L3. For example, the logical server L1 corresponds to the combination of the CPU and memory unit P1 and storage device h51 which are cut and brought down from the resources pools 12, 13 (as illustrated by dotted lines a1, a2). Other logical servers L2, L3 are similar to the logical server L1. In addition, the setting information w1 of V-LAN is cut and brought down from the network pool 15 and is applied to tenant Tn (as illustrated by dotted line a3). For example, the logical server L1 is virtual machine. The administration server 10 assigns the setting information w1 to the logical server L1 at the time of the construction of the virtual machine. However, it is not limited to the virtual machine, the logical server may be the physical machine. Thereby, a network (a virtual LAN) in the tenant Tn is built. In addition, each of the CPU and memory units P1-Pn has a NIC (Network Interface Card), and an IP (Internet Protocol) address is assigned to each of logical servers L1-L3. For example, the user controls the logical servers L1-L3 by accessing by using an IP address through the Internet.

In addition, the MAC address (Media Access Control address), where the uniqueness on the network is guaranteed, is physically assigned to the NIC. The MAC address (physical MAC address) is used to identify a station connected to the network. For example, the physical MAC address is written in an EEPROM (Electrically Erasable Programmable Read-Only Memory) in the physical server. The physical server reads the physical MAC address from the EEPROM at the time of start and writes the MAC address in the address setting register in a network control chip in the NIC. The MAC address is administrated assuming that a station with the same MAC address does not exist on the network.

In the embodiment, in order to simply explain, the CPU and memory unit is called as a physical server as follows. In addition, in the embodiment, the logical servers L1-L3 correspond to the CPU and memory units P1-Pn, one by one.

According to the resources pool management mechanism illustrated in FIG. 1 and FIG. 2, a physical server (for example, the CPU and memory unit P1), which is assigned to the logical server (for example, the logical server L1), may be replaced. For example, the physical server assigned to the logical server may be replaced according to the trouble and the maintenance of the physical server. As described above, because the (physical) MAC address is an address assigned to the NIC of the physical server physically, the MAC address of the logical server is changed according to a replacement of the physical server corresponding to the logical server. Influence may occur for the process of user's programs using the MAC address by the change of the MAC address of the logical server. For example, an IP address, which is provided from DHCP (Dynamic Host Configuration Protocol) server (not illustrated in FIG. 1 and FIG. 2), may be changed by the change of the MAC address, thereby a large influence occurs.

In order to avoid the influence due to the change of the physical MAC address by the exchange of the physical server, for example, the MAC address corresponding to the physical server after the exchange is forcibly rewritten to the MAC address corresponding to the physical server before the change.

In other words, the resources pool management mechanism in FIG. 2 cut and bring out the virtual MAC address "w2" from the network pool 15, and allocates the virtual MAC address "w2" to the logical server L1 (as illustrated by dotted line a4). And the logical server L1 maintains same operation by the MAC address by starting based on the virtual MAC address "w2", even if the physical server assigned to the logical server L1 is exchanged.

Figure 3:
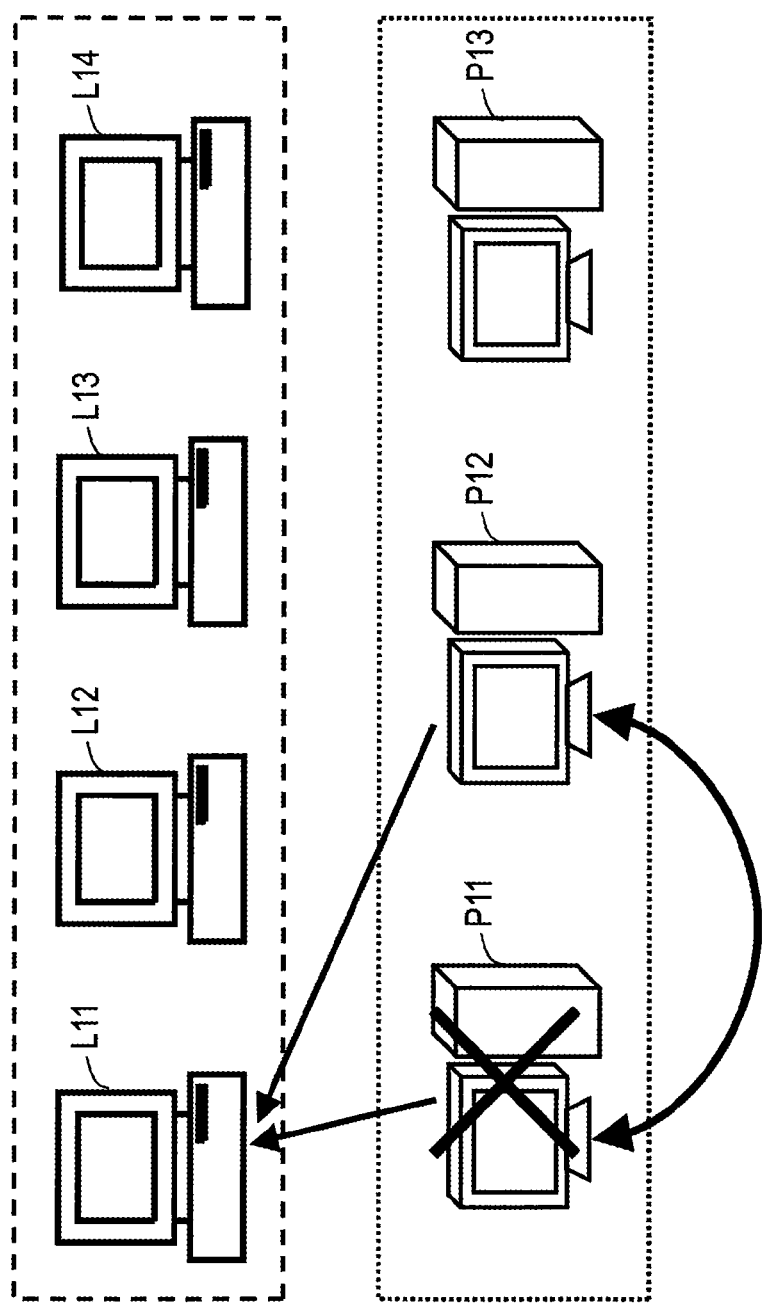
FIG. 3 is a diagram explaining a change of the corresponding relationship between the logical server and the physical server, as described in FIG. 2.

FIG. 3 is a diagram explaining a change of the corresponding relationship between the logical server and the physical server, as described in FIG. 2. In FIG. 3, the servers surrounded in a dashed line indicates the logical servers L11-L14, and the servers surrounded in a dotted line indicates the physics servers P11-P13. In an example of FIG. 3, the physical server P11 is assigned to the logical server L11 as illustrated by an arrow in FIG. 3. In addition, different physical servers are assigned each of other logical servers L12-L14 though not illustrated in FIG. 3.

In the example of FIG. 3, an operation will be explained in a case that the physical server P11 does not work, for example. When the physical server P11 does not work, the physical server P12 is assigned to the logical server L11 in substitution for the physical server P11, for example. However, the MAC address does not change when the physical server corresponding to the logical server L11 is exchanged, because the virtual MAC address is assigned to the logical server L11. Because a MAC address of the logical server L11 does not change, it is avoided to occur the influence for the user's programs which operate on the logical server L11.

As described by FIG. 1-FIG. 3, in the physical IaaS, a virtual MAC address is assigned to the logical server provided to the user. However, the virtual MAC address may be rewritten based on an intention or a fault. For example, the virtual MAC address is rewritten with malicious intent. Or, the virtual MAC address is rewritten by the malfunction of the program without intending. In addition, in order to confirm the virtual MAC address that is really assigned to the logical server, it is needed to start the logical server. Therefore, in a case that the virtual MAC address is rewritten, it is recognized that the virtual MAC address has been rewritten and that the virtual MAC address duplicates with that of other servers only, after the logical server starts.

The MAC address restoring method according to the embodiment, restores the rewritten virtual MAC address to a regular virtual MAC address, when starting after the virtual MAC address is rewritten. In below descriptions, the MAC address, of which uniqueness is guaranteed, is called as U-MAC (Unique MAC address) um. For example, the U-MAC um directs to the physical MAC address of the NIC in which the physical server has. However, the U-MAC um may be a virtual MAC address when the uniqueness is guaranteed. In addition, the MAC address, which is assigned dynamically, is called as D-MAC (Dynamic MAC address) dm. For example, the D-MAC dm is the virtual MAC address that is assigned logically not so as to duplicate in a network.

First Embodiment

Construction of the System

Figure 4:
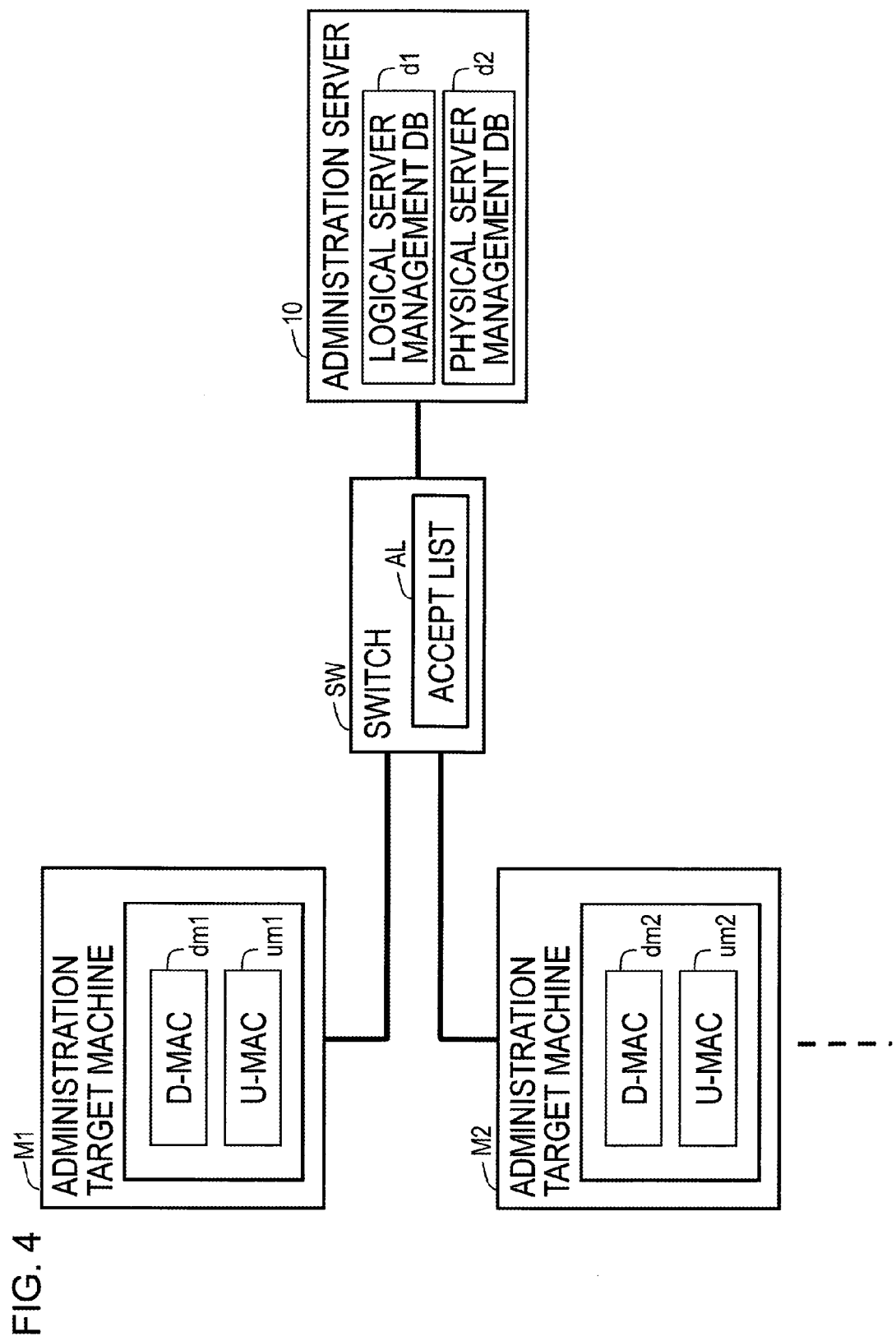
FIG. 4 is a diagram explaining MAC address restoration system according to the first embodiment.

FIG. 4 is a diagram explaining MAC address restoration system according to the first embodiment. The MAC address restoration system in FIG. 4 has the administration server 10 (referring to FIG. 1 and FIG. 2), a plurality of administration target machines M1 and M2, and a network communication device SW which connects each of administration target machines M1 and M2. In addition, each of the administration target machines M1 and M2 connects with the administration server 10 through the network communication device SW. In addition, in the example of FIG. 4, the controller 11, which is illustrated in FIG. 1 and FIG. 2, is omitted.

Further, the administration target machines M1 and M2 correspond to the physical servers (CPU, memory unit) P1-Pn and the logical servers L1-L4, L11-L14 which are explained by FIG. 1 to FIG. 3. In addition, the administration target machines M1 and M2 in the embodiment, hold the D-MAC dm1, dm2 which are assigned to the logical servers corresponding to the administration target machine and the U-MAC um1, um2 assigned to the physical servers corresponding to the administration target machines.

Furthermore, the administration server 10 in the embodiment holds a correspondence between the U-MAC um and regular D-MAC dm about each of the administration target machines M1, M2. Specially, the administration server 10 has a logical server management database (below called as a logical server management DB) d1 and a physical server management database (below called as a physical server management DB) d2 and administrates the correspondence between the U-MAC um and the regular D-MAC dm of each of the administration target machines M1 and M2 based on the logical server management DB d1 and the physical server management DB d2.

The network communication device SW in FIG. 4 performs filtering of a frame based on the MAC address, for example. The network communication device SW is constructed by a switch, for example. The network communication device SW is called as a switch as follows. The switch SW has an accept list AL having port numbers corresponding to each of the administration target machines M1 and M2 and the MAC address for each of the port numbers. The switch SW admits the passage of the frame transmitted by a MAC address registered with the accept list AL. In the embodiment, the accept list AL has the U-MAC um1, um2 information and the D-MAC dm1, dm2 information of each of the administration target machines M1 and M2 for each of the port numbers corresponding to each of the administration target machines M1 and M2.

Further, according to the restoration method of the MAC address in the embodiment, the administration target machine sends a first frame (called as MAC address confirmation frame), which has the D-MAC dm to hold as an origin of transmission, to the administration server 10 and sends a second frame (called as D-MAC demand frame), which has the U-MAC um as an origin of transmission, to the administration server 10, when there is not a reply from the administration server 10 for the first frame. In addition, the administration server 10 answers a third frame including a regular D-MAC dm corresponding to the U-MAC um in response to the second frame. And the administration target machine restores the D-MAC dm to the regular D-MAC dm included in the third frame in response to the third frame and restarts based on the D-MAC dm after the restoration.

When the D-MAC dm, of which the administration target machine holds, is rewritten, the D-MAC dm, of which the administration target machine holds, is different from the D-MAC dm registered in the accept list AL. In this case the frame having the D-MAC dm as the origin of the transmission, of which the administration target machine holds, does not arrive at the administration server 10, because the frame does not pass the switch SW. Therefore the administration target machine judges whether or not holds the regular D-MAC dm based on a presence or non-presence of the reply from the administration server 10.

In addition, the administration target machine, when determining that the administration target machine does not hold the regular D-MAC dm, receives the regular D-MAC dm from the administration server 10 using the U-MAC um, restores the D-MAC dm and restarts. In other words, the administration target machine restores the D-MAC dm while avoiding the duplication of the MAC address of the other machines by temporarily using the U-MAC um where the uniqueness is guaranteed.

Next, the constitution of the administration server 10 and the administration target machine M1 according to the embodiment will be explained. At first the constitution and the block diagram of the administration server 10 will be explained.

(Constitution of the Administration Server)

Figure 5:
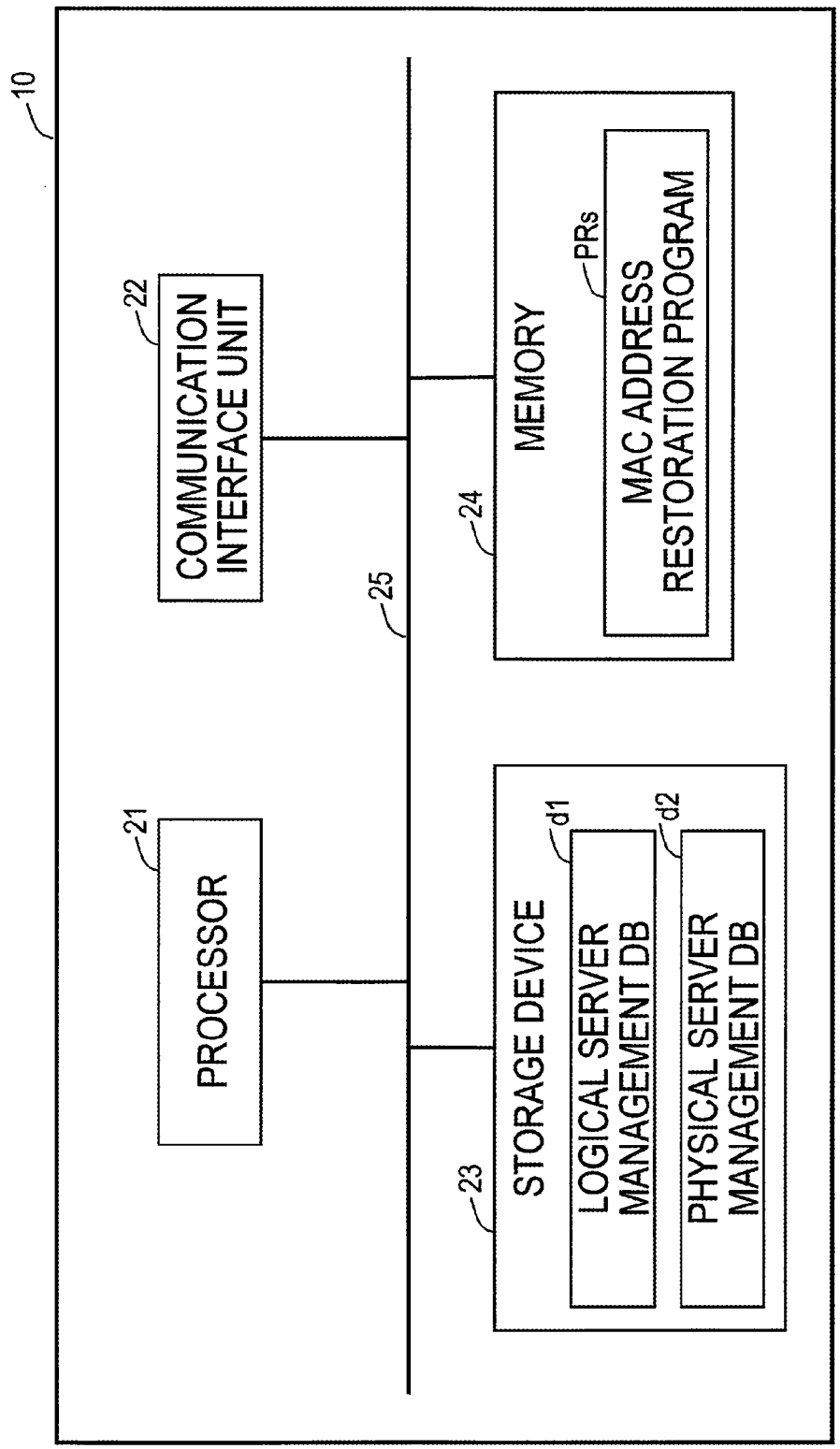
FIG. 5 is a diagram explaining hardware constitution of the administration server 10 according to the embodiment.

FIG. 5 is a diagram explaining hardware constitution of the administration server 10 according to the embodiment. The administration server 10 depicted by FIG. 5 has a processor 21, a communication interface unit 22, a storage device 23 such as HDDs, and a memory 24. Each of components is connected through a bus 25 each other. The communication interface unit 22 corresponds to the NIC. The administration server 10 connects with the switch SW (referring to FIG. 4) through the communication interface unit 22.

The storage device 23 stores the logical server management DB d1 (referring to FIG. 4) and the physical server management DB d2 (referring to FIG. 4). The logical server management DB d1 and the physical server management DB d2 have the correspondence between the U-MAC um and the D-MAC dm for each of the administration target machines. Details of the logical server management DB d1 and the physical server management DB d2 will be explained in later FIG. 7. In addition, the memory 24 stores the MAC address restoration program PRs of the administration server 10 in the embodiment. The MAC address restoration program PRs of the administration server 10 is executed by the processor 21 and realizes the MAC address restoration process of the administration server 10 side in the embodiment.

(Block Diagram of the Administration Server)

Figure 6:
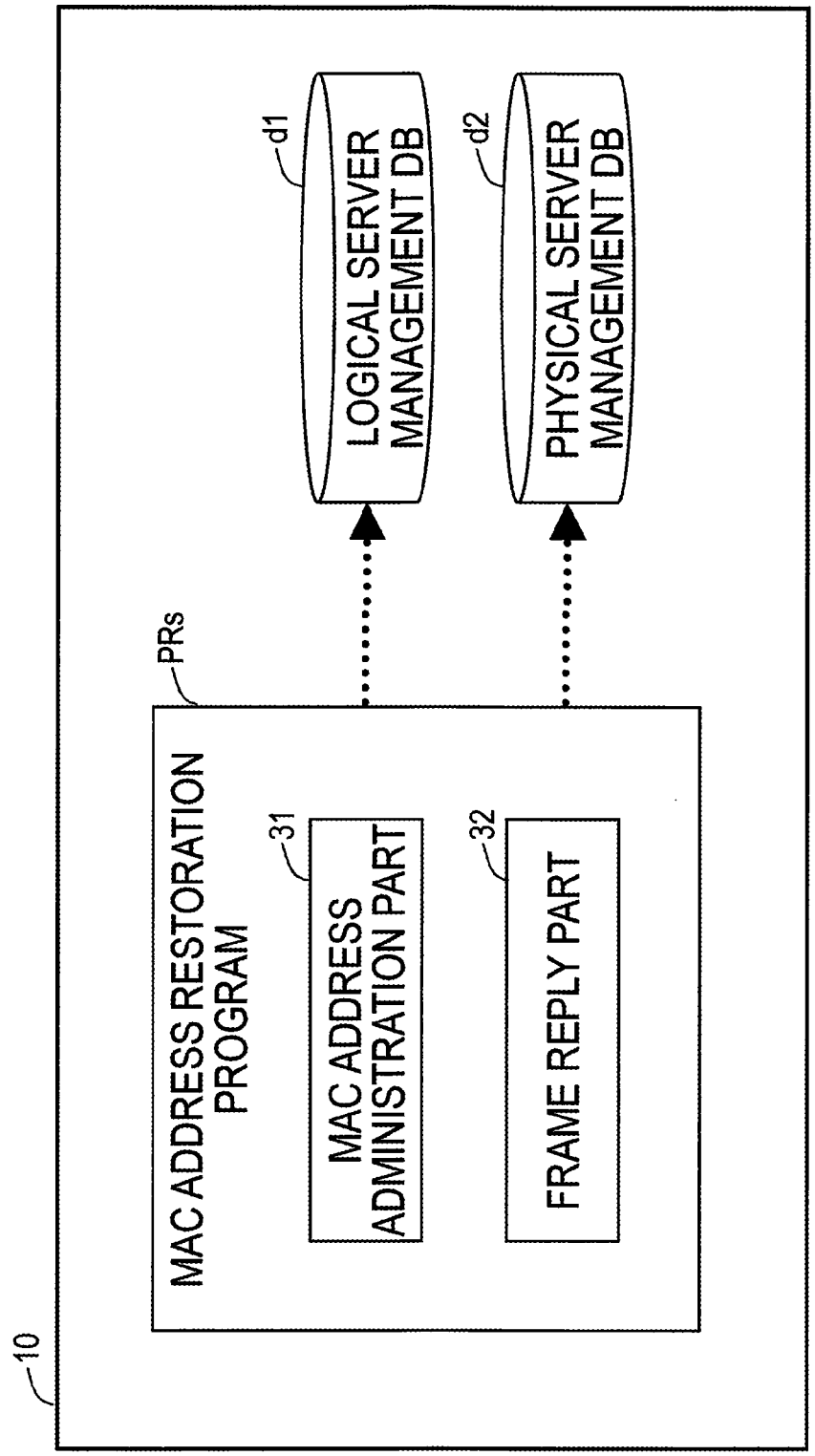
FIG. 6 is a diagram explaining a software block diagram of the administration server 10 in the embodiment.

FIG. 6 is a diagram explaining a software block diagram of the administration server 10 in the embodiment. The MAC address restoration program PRs in the administration server 10 in FIG. 6 has a MAC address administration part 31 and a frame reply part 32. The MAC address administration part 31 manages the regular D-MAC dm1, dm2 corresponding to the U-MAC um1, um2 of each of the administration target machines M1 and M2. Specially, the MAC address administration part 31 manages the regular D-MAC dm1, dm2 corresponding to the U-MAC um1, um2 of each of the administration target machines M1 and M2 based on the logical server management DB d1 and the physical server management DB d2. In addition, the frame reply part 32 sends a reply frame to the administration target machine of the origin of transmission of the frame, in response to the MAC address confirmation frame and the D-MAC demand frame transmitted from the administration target machines M1 and M2.

(Logical Server Management DB, Physical Server Management DB)

FIG. 7A and FIG. 7B are diagrams explaining the logical server management DB d1 and the physical server management DB d2 of which the administration server 10 holds. FIG. 7A illustrates the logical server management DB d1 having information for each of the logical servers, and FIG. 7B illustrates the physical server management DB d2 having information for each of the physical servers. As above described, the logical server and the physical server are corresponded with each other one by one and are equivalent to the administration target machines M1 and M2.

The logical server management DB d1 in FIG. 7A stores a logical server ID (Identification) to distinguish the logical server, the D-MAC dm and a physical server ID (Identification) to distinguish the physical server corresponding to the logical server. That is, the logical server management DB d1 has the physical server ID corresponding to the logical server in addition to the information of the logical server for each of the logical server.

For example, in the logical server management DB d1 in FIG. 7A, the information of the logical servers L1, L2 and L3 are exemplified. That is, the logical server management DB d1 stores D-MAC dm information "01:00:00:00:00:01", which was assigned to the logical server L1 in which the logical server ID is "L1". And, for example, when the physical server P5 is assigned for the logical server L1, "P5" of the physical server ID is registered with information of the logical server L1 in the logical server management DB d1.

In the same way, the logical server management DB d1 stores D-MAC dm information "01:00:00:00:00:02", which was assigned to the logical server L2 in which the logical server ID is "L2". And, for example, when the physical server P1 is assigned for the logical server L2, "P1" of the physical server ID is registered with information of the logical server L2 in the logical server management DB d1. About the logical server ID "L3", it is similar. That is, in the logical server management DB d1 in FIG. 7A, the physical server P2 is assigned for the logical server L3.

In addition, the physical server management DB d2 in FIG. 7B stores a physical server ID to distinguish the physical server, a switch ID to connect to the physical server, a port ID (port number), U-MAC um assigned to the physical server uniquely and D-MAC dm of the logical server corresponding to the physical server. That is, the physical server management DB d2 has the D-MAC dm of the logical server corresponding to the physical server in addition to the information of the physical server for each of the physical server.

For example, in the physical server management DB d2 in FIG. 7B, the information of the physical servers P1, P2 and P3 are exemplified. That is, the physical server management DB d2 stores the switch ID "1" and corresponding port ID "1" which connects to the physical server P1 in which the physical server ID is "P1". In addition, the physical server management DB d2 stores information of U-MAC um "00:00:00: 00:00:01" of the physical server P1. And, for example, when the physical server P1 is assigned for the logical server L2, the information of D-MAC dm "01:00:00: 00:00:02" of the logical server L2 is registered with information of the physical server P1 in the physical server management DB d2.

Similarly, the physical server management DB d2 stores the switch ID "1" and corresponding port ID "2" which connects to the physical server P2 in which the physical server ID is "P2". In addition, the physical server management DB d2 stores information of U-MAC um "00:00:00: 00:00:02" of the physical server P2. And, for example, when the physical server P2 is assigned for the logical server L3, the information of D-MAC dm "01:00:00:00:00:03" of the logical server L3 is registered with information of the physical server P2 in the physical server management DB d2. It is similar about the other servers.

It is possible that the administration server 10 acquires the regular D-MAC dm of the logical server assigned to the physical server having the U-MAC um based on the U-MAC um by referring to the physical server management DB d2. In addition, in the example of FIG. 7A and FIG. 7B, the logical server management DB d1 and the physical server management DB d2 are constructed by different database. However, the logical server management DB d1 and the physical server management DB d2 may be constructed as one database.

Next, the constitution of the administration target machines M1 and M2 will be explained. As described above, the administration target machines M1 and M2 correspond to the physical servers (CPU, memory units) P1-Pn and the logical servers L1-L4, L11-L14 which are explained by FIG. 1 to FIG. 3.

(Constitution of the Administration Target Machine)

Figure 8:
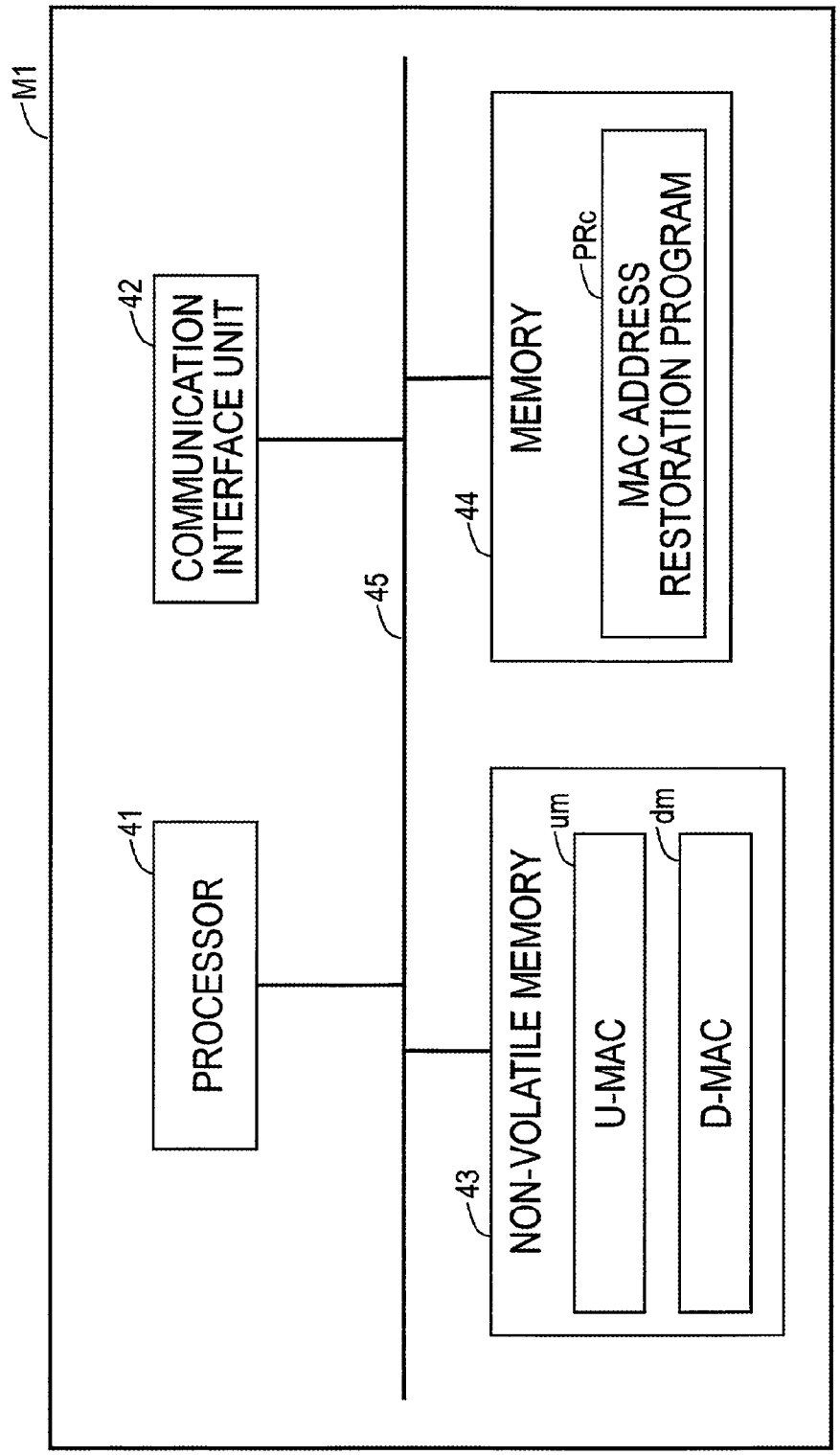
FIG. 8 is a diagram explaining hardware constitution of the administration target machine M1 according to the embodiment.

FIG. 8 is a diagram explaining hardware constitution of the administration target machine M1 according to the embodiment. In FIG. 8, the hardware constitution of the administration target machine M1 will be explained, but the hardware constitution of the administration target machine M2 is similar.

The administration target machine M1 depicted by FIG. 8 has a processor 41, a communication interface unit 42, a non-volatile memory 43, and a memory 44. Each of these components is connected through a bus 45 each other. The communication interface unit 42 corresponds to the NIC. The administration target machine M1 connects with the switch SW (referring to FIG. 4) through the communication interface unit 42. The memory 44 stores the MAC address restoration program PRc of the administration target machine M1 in the embodiment. The MAC address restoration program PRc of the administration target machine M1 is executed by the processor 41 and realizes the MAC address restoration process of the administration target machine M1 side in the embodiment.

The non-volatile memory 43 stores the D-MAC dm, which is dynamically assigned, in addition to the U-MAC um where the uniqueness is guaranteed. The administration target machine M1 in the embodiment executes a start process based on the MAC address which is selected among the U-MAC um and the D-MAC dm.

For example, the NIC 42 selects an MAC address by changing the storage area of the MAC address which is referred to at the time of start of the administration target machine M1. Specially, the NIC 42 changes the storage area of the MAC address which is referred to at the time of start of administration target machine M1 between a storage area of U-MAC um and a storage area of D-MAC dm. Or a MAC address is selected by rewritten the MAC address of the storage area that the NIC 42 refers to. Specially, a MAC address is selected by rewritten the MAC address held in the storage area by the U-MAC um or the D-MAC dm. However, the selection technique of the MAC address is not limited to these examples.

(Block Diagram of the Administration Target Machine)

Figure 9:
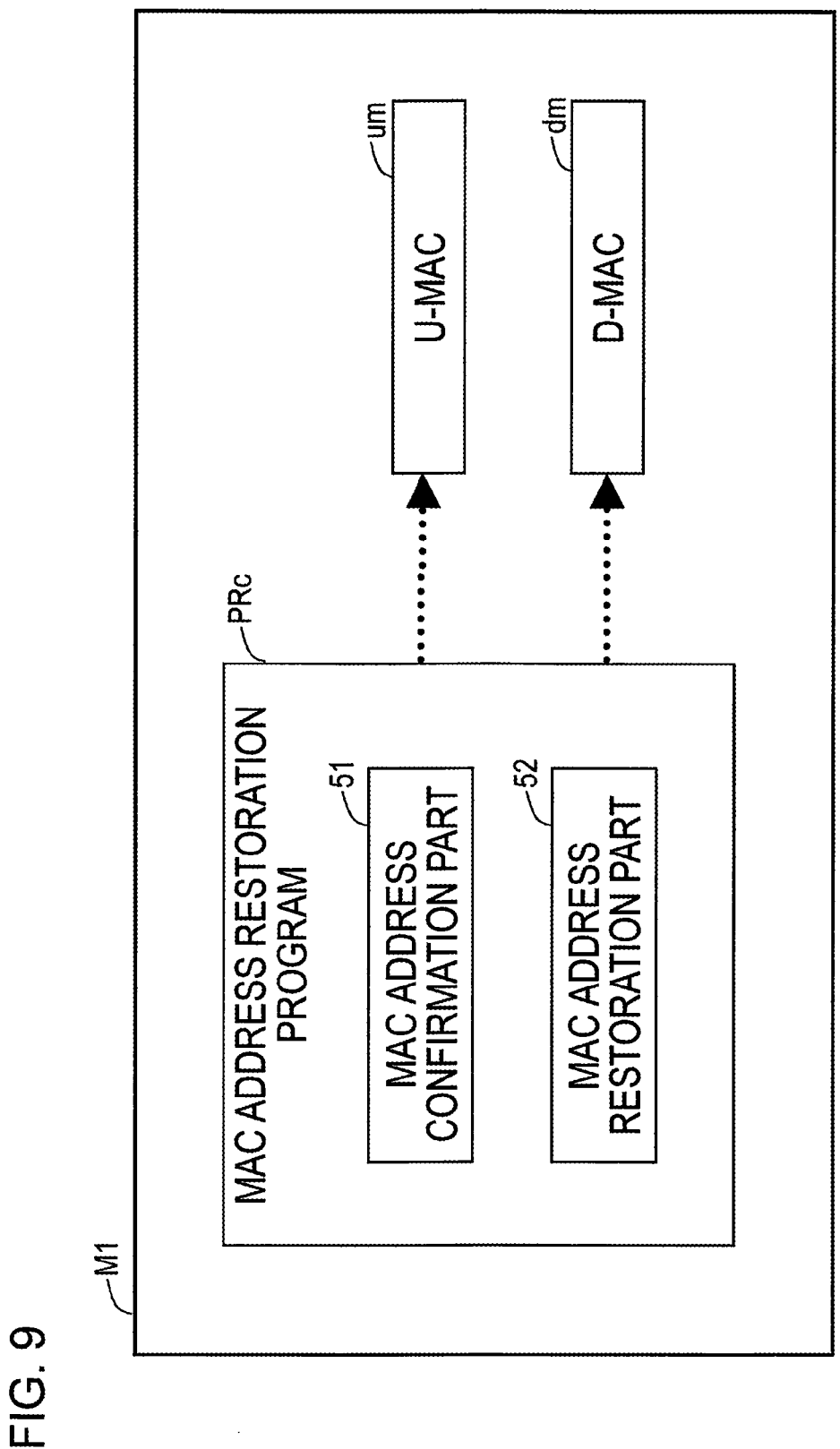
FIG. 9 is a diagram explaining software block diagram of the administration target machine M1 according to the embodiment.

FIG. 9 is a diagram explaining software block diagram of the administration target machine M1 according to the embodiment. In FIG. 9, the software block diagram of the administration target machine M1 will be explained, but the software block diagram of the administration target machine M2 is similar. The MAC address restoration program PRc of the administration target machine M1 in FIG. 9 has a MAC address confirmation part 51 and a MAC address restoration part 52. In addition, the administration target machine M1 has the U-MAC um and the D-MAC dm as described in FIG. 8.

The MAC address confirmation part 51 transmits a MAC address confirmation frame which requires a confirmation of the D-MAC dm of the administration target machine M1 to the administration server 10. The MAC address restoration part 52, when there is not the reply of the MAC address confirmation frame from the administration server 10, transmits the D-MAC demand frame to the administration server 10. And the MAC address restoration part 52 restores the D-MAC dm, of which administration target machine M1 holds, based on the regular D-MAC dm included in the reply of the D-MAC demand frame from the administration server 10.

Next, the process of the administration server 10 and the administration target machines M1 and M2 in the restoration method of the MAC address according to the embodiment will be explained using a figure of flow chart. At first, the process of the administration target machines M1 and M2 will be explained.

(Process of the Administration Target Machine)

Figure 10:
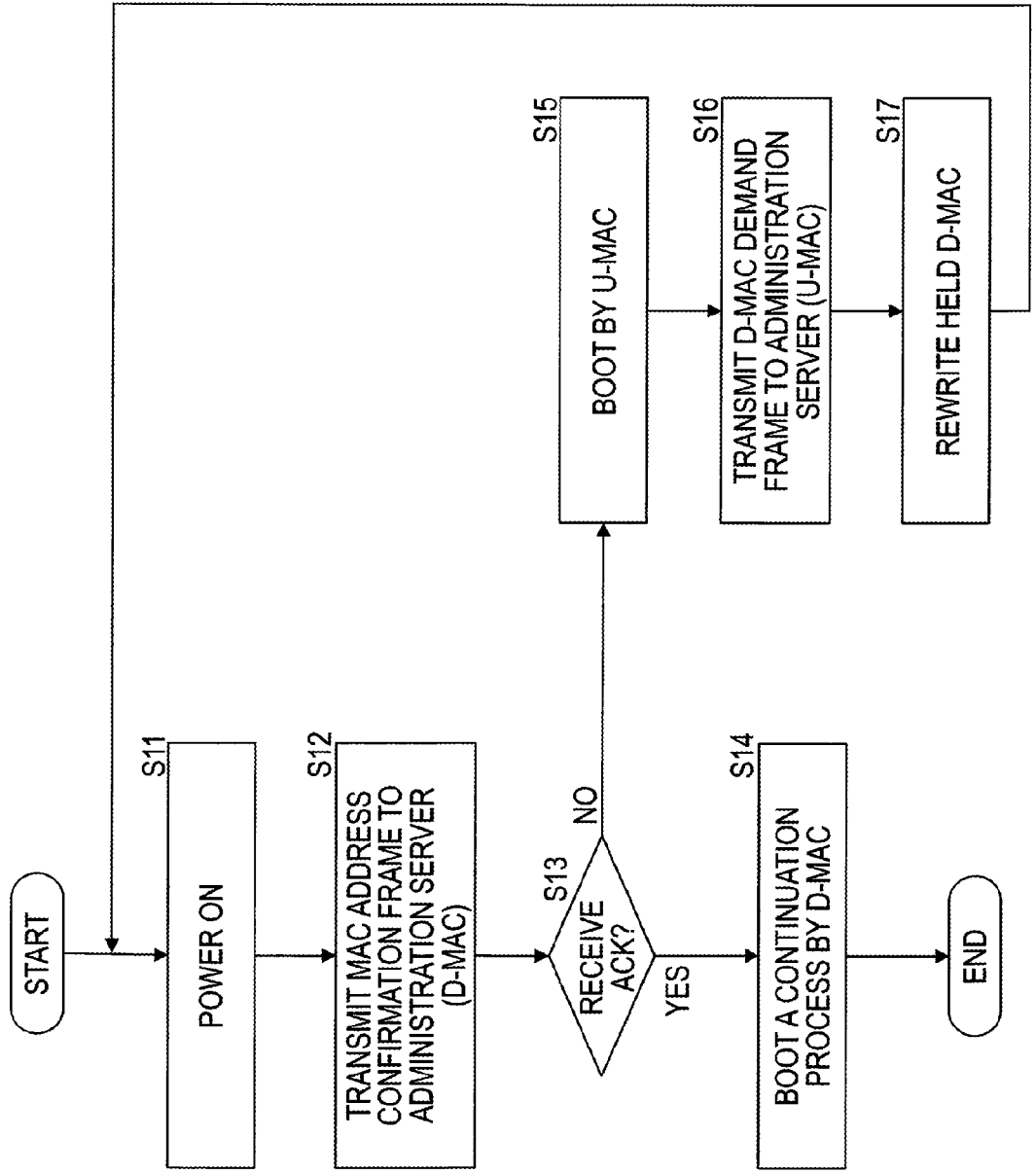
FIG. 10 is a diagram of a flow chart explaining process of the administration target machine M1 according to the embodiment.

FIG. 10 is a diagram of a flow chart explaining process of the administration target machine M1 according to the embodiment. In the flow chart of FIG. 10, the process of the administration target machine M1 will be explained, but the process of the administration target machine M2 is similar.

Firstly, the administration target machine M1 starts the start process based on an enter of the power supply (S11). Next, the MAC address confirmation part 51 in the administration target machine M1 sends a frame (MAC address confirmation frame) which instructs the confirmation of the MAC address to the administration server 10 (S12). The MAC address confirmation frame has D-MAC dm, of which the administration target machine M1 holds, as a MAC address of the origin of transmission.

For example, the MAC address confirmation part 51 in the administration target machine M1 transmits the MAC address confirmation frame to the administration server 10 by a broadcast. According to the broadcast, a frame is transmitted to all stations on the network (the range where the frame arrives at). Therefore, the administration target machine M1 does not have to hold a MAC address of the administration server 10. In addition, the administration target machine M1 becomes able to transmit the frame to the administration server 10, when the MAC address of the administration server 10 is changed. While, the MAC address confirmation part 51 in the administration target machine M1 may detect the MAC address of the administration server 10 beforehand, and may transmit the MAC address confirmation frame to the administration server 10 by a uni-cast.

The MAC address confirmation part 51 in the administration target machine M1 waits a reply from the administration server 10 after the MAC address confirmation part 51 in the administration target machine M1 transmits the MAC address confirmation frame to the administration server 10 (S13). Specially, the MAC address confirmation part 51 in the administration target machine M1 waits an ACK (ACKnowledgement) corresponding to the MAC address confirmation frame from the administration server 10. A case, which is received the ACK from the administration server 10 (S13/YES), points to that the MAC address confirmation frame arrived at the administration server 10. In other words, it points to that the D-MAC dm, of which the administration target machine M1 has, is not rewritten. Therefore, the MAC address confirmation part 51 in the administration target machine M1 starts a boot of the administration target machine M1 based on the D-MAC dm where the administration target machine M1 holds (S14).

On the other hand, a case, which is not received the ACK from the administration server 10 (S13/NO), that is, a wait of the ACK does time-out, points to that the MAC address confirmation frame is not arrived at the administration server 10. When the D-MAC dm of the origin of transmission in the MAC address confirmation frame is different from the regular D-MAC dm, the switch SW does not admit the passage of the MAC address confirmation frame. Therefore, the MAC address confirmation frame does not arrive at the administration server 10. In other words, a time-out of waiting of the ACK points to that the D-MAC dm, of which the administration target machine M1 has, is rewritten.

In this way, it is possible that the MAC address confirmation part 51 in administration target machine M1 judges whether the D-MAC dm which is held is appropriate based on the presence of the reply from the administration server 10. In addition, because the switch SW admits to pass based on the regular D-MAC dm, it is avoided that the frame, which has an unfair D-MAC dm as the origin of transmission, flows out from the switch SW. Therefore, it is avoided that influence produces to the other machines when the D-MAC dm of the administration target machine M1 is rewritten to the D-MAC dm of the other machine which duplicates.

When the D-MAC dm, in which the administration target machine M1 holds, is not the regular D-MAC dm, the MAC address restoration part 52 in the administration target machine M1 starts a boot of the administration target machine M1 based on the U-MAC um where the administration target machine M1 holds (S15). Then, the MAC address restoration part 52 in the administration target machine M1 sends a frame (called as D-MAC demand frame, below), which requires the regular D-MAC dm of the administration target machine M1, to the administration server 10 (S16). The D-MAC demand frame has the U-MAC um of which the administration target machine M1 holds as a MAC address of the origin of transmission.

The U-MAC um is the MAC address that the uniqueness is guaranteed. Therefore, it is possible that the MAC address restoration part 52 in the administration target machine M1 does the administration target machine M1 in the state that communicate with the administration server 10 while avoiding the overlap of the MAC address with other administration target machines by starting temporarily based on the U-MAC um. And the administration target machine M1 receives the regular D-MAC dm from the administration server 10.

When the administration server 10 receives the D-MAC demand frame, the administration server 10 searches the regular D-MAC dm of the administration target machine M1 based on the U-MAC um of the origin of transmission included in the D-MAC demand frame. And the administration server 10 transmits a frame including the regular D-MAC dm to the administration target machine M1.

When the administration target machine M1 receives the reply frame for the D-MAC demand frame from the administration server 10, the MAC address restoration part 52 in the administration target machine M1 restores the D-MAC dm held based on the regular D-MAC dm included in the frame (that is, rewritten the D-MAC dm into the regular D-MAC dm) (S17). Then the MAC address restoration part 52 in the administration target machine M1 re-starts (re-boots) the administration target machine M1 based on the restored D-MAC dm (S11). Thereby, the administration target machine M1 is started based on the regular D-MAC dm. In other words, a MAC address in the administration target machine M1 is restored by an appropriate MAC address.

Next, the process of the administration server 10 in the restoration method of the MAC address in the embodiment will be explained based on a flow chart. Firstly, the process of allocation of the logical server and the process at the time of the start of administration target machine M1 by the administration server 10 will be explained.

(Process of the Administration Server)

Figure 11:
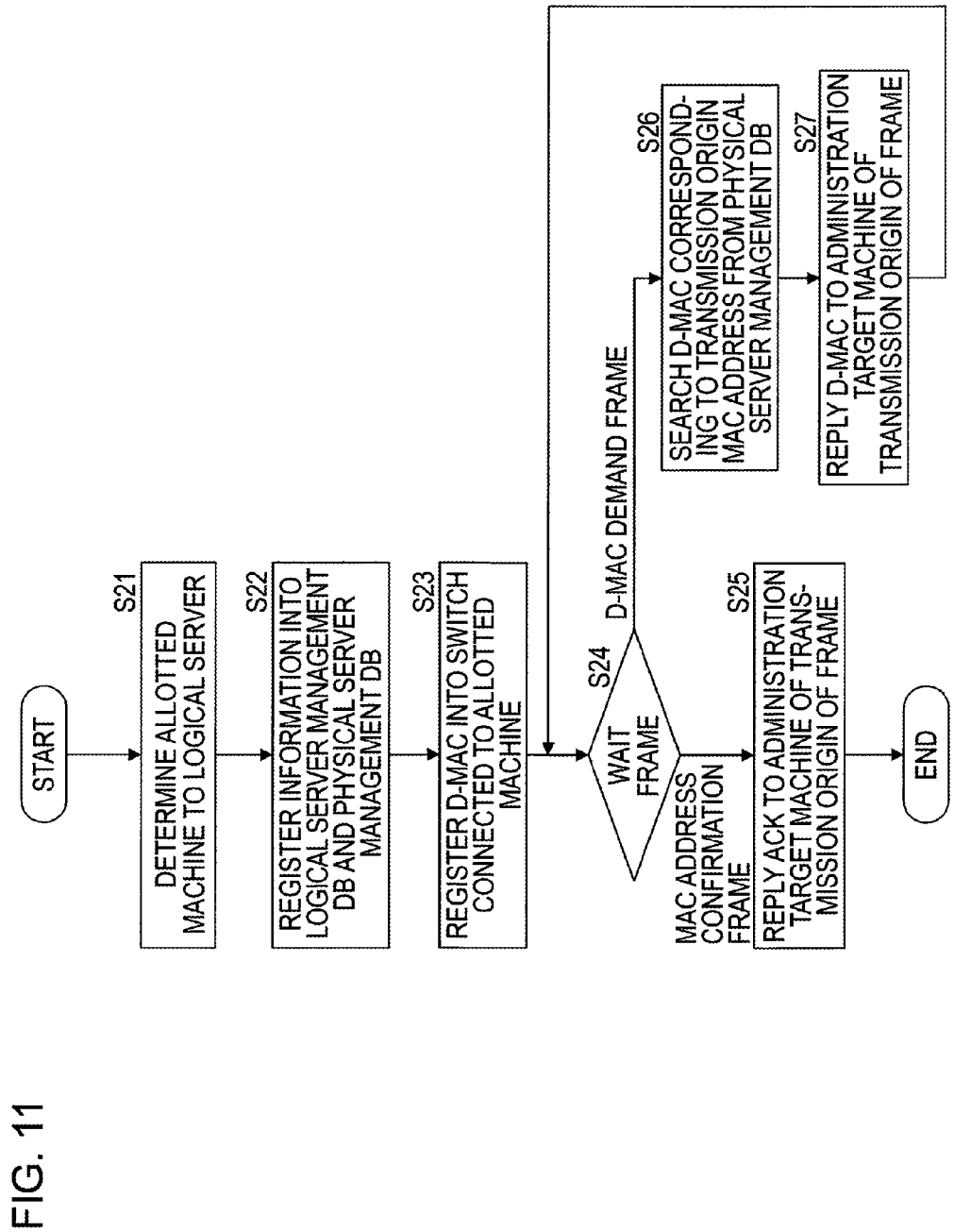
FIG. 11 is a figure of a flow chart explaining processing of allocation of the logical server and processing at the time of the start of administration target machine M1 by the administration server according to the embodiment.

FIG. 11 is a figure of a flow chart explaining processing of allocation of the logical server and processing at the time of the start of administration target machine M1 by the administration server according to the embodiment. The administration server 10 decides a physical server which is assigned to the logical server according to an instruction by software which manages the resource, for example (S21).

Next, the MAC address administration part 31 (referring to FIG. 6) in the administration server 10 registers information of the physical server which was assigned to the logical server with the logical server management DB d1 and the physical server management DB d2 (S22). Specially, the MAC address administration part 31 in the administration server 10 registers the physical server ID which was assigned to the logical server with a target logical server information in the logical server management DB d1. And the MAC address administration part 31 in the administration server 10 registers the D-MAC dm of the logical server which is an allotment of the physical server with physical server information in the physical server management DB d2.

Next, the MAC address administration part 31 in the administration server 10 registers the U-MAC um of the physics server and the D-MAC dm of the logical server with the accept list AL in the switch SW (referring to FIG. 4) which is connected to the administration target machine M1 (S23). By registering the U-MAC um and the D-MAC dm in the accept list AL, the switch SW admits the passage of the frame in which the U-MAC um or the D-MAC dm is the MAC address of the origin of transmission.

By executing the steps S21-S23, the process of the allotment of the physical server to the logical server is completed. Next, the frame reply part 32 in the administration server 10 waits the frame which is sent from the administration target machine M1 (S24). The frame reply part 32 in the administration server 10, when receiving a frame, judges whether the frame is the MAC address confirmation frame or the D-MAC demand frame. The frame reply part 32 in the administration server 10, when determining that received frame is the MAC address confirmation frame, replies the ACK to the MAC address of the origin of transmission included in the received frame (S25). In this case, the MAC address of the origin of transmission that the received frame includes is the D-MAC dm of the administration target machine M1.

On the other hand, the frame reply part 32 in the administration server 10, when determining that received frame is the D-MAC demand frame, searches for the D-MAC dm corresponding to the MAC address of the origin of transmission that the D-MAC demand frame includes with reference to the physical server management DB d2 (S26). In this case, the MAC address of the origin of transmission that D-MAC demand frame includes is the U-MAC um of the administration target machine M1. Then, the frame reply part 32 in the administration server 10 sends a frame including searched D-MAC dm information to the MAC address (that is, the U-MAC um of the administration target machine M1) of the origin of transmission included in the received frame (S27)

Figure 12:
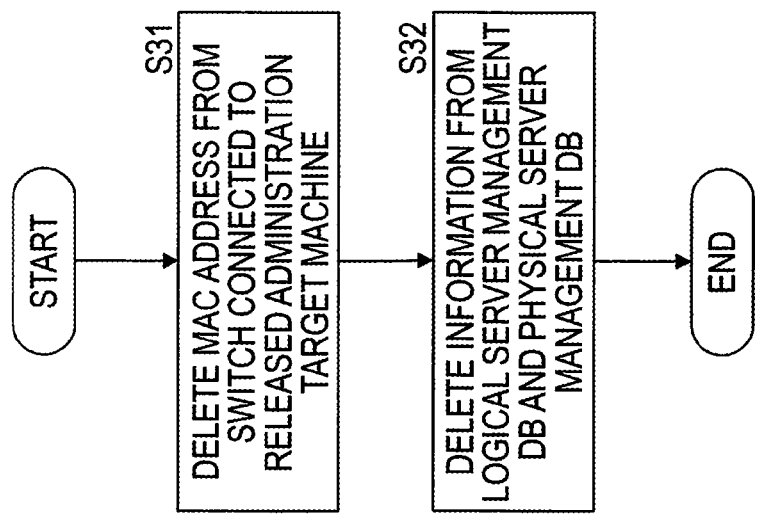
FIG. 12 is a diagram of a flow chart explaining release process of the logical server by the administration server 10 according to the embodiment.

FIG. 12 is a diagram of a flow chart explaining release process of the logical server by the administration server 10 according to the embodiment. The MAC address administration part 31 in the administration server 10 deletes the D-MAC dm of the administration target machine M1 from the accept list AL in the switch SW which connects to the administration target machine M1 corresponding to the logical server of release target (S31).

Then, the MAC address administration part 31 in the administration server 10 deletes the information of the administration target machine corresponding to the logical server of release target from the logical server management DB d1 and the physical server management DB d2 of which the administration server 10 holds (S32). Specially, the MAC address administration part 31 in the administration server 10 deletes the physical server ID assigned to the logical server concerned from the information of the target logical server in the logical server management DB d1. In addition, the MAC address administration part 31 in the administration server 10 deletes the D-MAC dm of the target logical server from the information of the physical server which is assigned to the target logical server in the physical server management DB d2.

Next, the processing of the administration target machines M1, M2 and the administration server 10, which are explained by the flow charts in FIG. 10-FIG. 12, will be explained based on a specific example.

Specific Example

Figure 13:
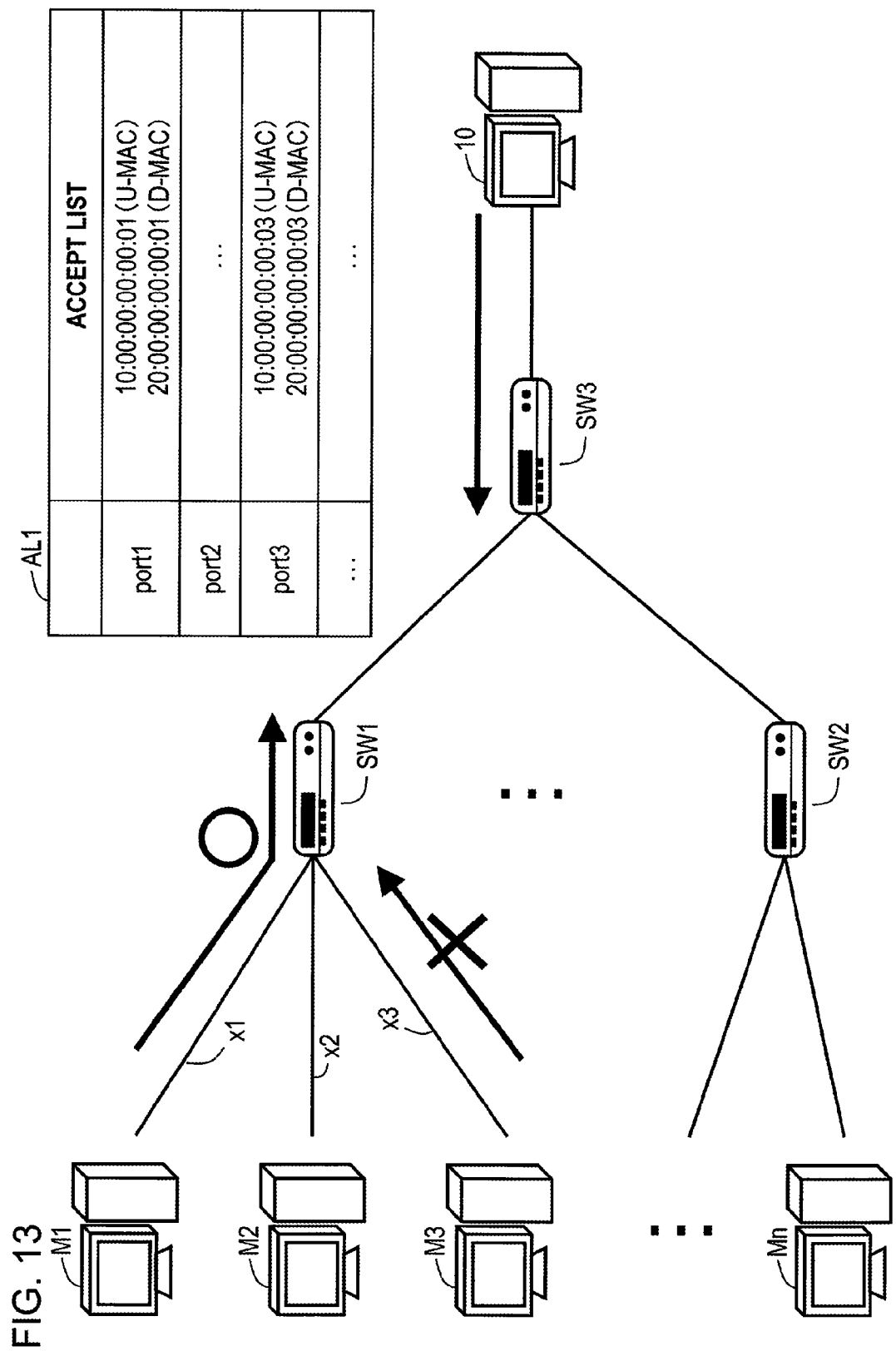
FIG. 13 is a diagram explaining the specific example of the MAC address restoration method according to the embodiment.

FIG. 13 is a diagram explaining the specific example of the MAC address restoration method according to the embodiment. In an example of FIG. 13, each of the administration target machines M1-Mn connects with the administration server 10 through the switches SW1-SW3. Specially, the administration target machine M1 connects with a port 1 in the switch SW1 (as illustrated by mark "x1" in FIG. 13). Similarly, the administration target machine M2 connects with a port 2 in the switch SW1 (as illustrated by mark "x2" in FIG. 13) and the administration target machine M3 connects with a port 3 in the switch SW1 (as illustrated by mark "x3" in FIG. 13).

When the MAC address administration part 31 in the administration server 10 decides the physical server which is assigned to the logical server (S21 in FIG. 11), the MAC address administration part 31 in the administration server 10 registers relationship information of the logical server and the physical server with the logical server management DB d1 and the physical server management DB d2 (S22 in FIG. 11). In the example, the logical server management DB d1 stores the U-MAC um "10:00:00:00:00:01" and the D-MAC dm "20:00:00:00:00:01" of the administration target machine M1. In addition, the logical server management DB d1 stores the U-MAC um "10:00:00:00:00:03" and the D-MAC dm "20:00:00:00:00:03" of the administration target machine M3.

In addition, the MAC address administration part 31 in the administration server 10 registers the U-MAC um and the D-MAC dm in the accept list Ail in the switch SW1 which connects to the administration target machines M1~M3 (S23 in FIG. 11). Therefore, the accept list Ail in the switch SW1 stores the U-MAC um "10:00:00:00:00:01" and the D-MAC dm "20:00:00:00:00:01" of the administration target machine M1 in port 1 column. In addition, the accept list AL1 in the switch SW1 stores the U-MAC um "10:00:00:00:00:03" and the D-MAC dm "20:00:00:00:00:03" of the administration target machine M3 in port 3 column.

In the example, the administration target machine M1 holds the regular D-MAC dm. On the other hand, the administration target machine M3 holds D-MAC dm "20:00:00:00:00:A3" which is different from the regular D-MAC dm "20:00:00:00:00:03".

Firstly, the process at the time of the start of the administration target machine M1, which holds the regular D-MAC dm, will be explained. The MAC address confirmation part 51 of the administration target machine M1, for example, sends the MAC address confirmation frame to the administration server 10 (S11 in FIG. 12) at the time of the beginning of start (S11 in FIG. 10). In this time, transmission origin MAC address in the MAC address confirmation frame is D-MAC dm "20:00:00:00:00:01". As described above, in the specific example, the D-MAC dm of which the administration target machine M1 holds is the regular D-MAC dm. Therefore, the MAC address confirmation frame, of which the administration target machine M1 transmits, arrives at the administration server 10 through the switches SW1 and SW3.

Then, the frame reply part 32 in the administration server 10, when receiving the MAC address confirmation frame from the administration target machine (S24 in FIG. 11), sends the ACK to the MAC address of the origin of transmission that the MAC address confirmation frame includes, that is, D-MAC dm "20:00:00:00:00:01" of the administration target machine M1 (S25 in FIG. 11). When the MAC address confirmation part 51 in the administration target machine M1 receives ACK from the administration server 10 (S13/YES in FIG. 10), the MAC address confirmation part 51 starts boot process of the administration target machine based on the D-MAC dm (S14 in FIG. 10), because it is determined that the D-MAC dm is not rewritten.

Secondly, the process at the time of the start of the administration target machine M3, which does not hold the regular D-MAC dm, will be explained. The MAC address confirmation part 51 of the administration target machine M3, for example, sends the MAC address confirmation frame that the transmission origin MAC address in the MAC address confirmation frame is D-MAC dm "20:00:00:00:00:A3", to the administration server 10 (S12 in FIG. 10), at the time of the beginning of start (S11 in FIG. 10). As described above, the D-MAC dm "20:00:00:00:00:A3" is different from the regular D-MAC dm "20:00:00:00:00:03". Therefore, the switch SW1 does not admit the passage of the MAC address confirmation frame, thereby the wait of ACK from the administration server 10 for the MAC address confirmation frame becomes time-out (S13/NO in FIG. 10).

The switch SW1 does not admit the passage of the frame in which the MAC address that is not registered with the accept list Ail is an origin of transmission. Therefore, it is avoided that influence produces to the other machines even if the D-MAC dm of the administration target machine M3 is rewritten to a MAC address which duplicates that of the other machines.

When the wait of ACK becomes time-out (S13/NO in FIG. 10), the MAC address restoration part 52 in the administration target machine M3 starts the boot process of the administration target machine M3 based on the U-MAC um "10:00:00:00:00:03" (S15). In other words, the MAC address restoration part 52 in the administration target machine M3 becomes able to communicate with the administration server 10 temporarily by starting based on the U-MAC um where the uniqueness is guaranteed. And the MAC address restoration part 52 in the administration target machine M3 sends a frame requiring the regular D-MAC dm of the administration target machine M3 to the administration server 10 (S16 in FIG. 10).

When the frame reply part 32 in the administration server 10 receives the D-MAC demand frame (S24 in FIG. 11), the frame reply part 32 searches the D-MAC dm corresponding to the MAC address "10:00:00:00:00:03" of the origin of transmission in the D-MAC demand frame by referring the physical server management DB d2 (S26 in FIG. 11). And the frame reply part 32 in the administration server 10 transmits a frame including the searched D-MAC dm "20:00:00:00:00:03" to the administration target machine M3 (S27 in FIG. 11).

The MAC address restoration part 52 in the administration target machine M3, when receiving the frame including the regular D-MAC dm "20:00:00:00:00:03" from the administration server 10, restores the D-MAC dm by rewriting D-MAC dm which is held (S17 in FIG. 10), and re-starts (reboots) the administration target machine M3 based on the D-MAC dm after the restoration (S11 in FIG. 10). Thereby, the administration target machine M3 is re-started (rebooted) based on the regular D-MAC dm, and a MAC address is restored. Therefore, the possibility of the overlap of the MAC address on the network is also avoided.

As described above, according to the MAC address restoration method in the embodiment, it is possible that the administration target machines M1-Mn judge whether the held D-MAC is appropriate based on the presence of the reply from the administration server 10. In addition, the administration target machines M1-Mn enable communication with the administration server 10 by using the U-MAC um where the uniqueness is guaranteed temporarily and acquires the regular D-MAC dm from the administration server 10. The U-MAC um is guaranteed the uniqueness. In addition, the switch SW1 does not admit the passage of the frame in which the MAC address that is not registered with the accept list Ail is an origin of transmission. Therefore, it is possible to automatically restore a MAC address while avoiding the influence on other machines even if the administration target machines M1-Mn are rewritten to a MAC address which duplicates with that of the other machines.

In addition, in the first embodiment, a method, which restores a MAC address at the time of start of the administration target machines M1-Mn, was described. However, the restoration method of the MAC address in the embodiment is not limited at the time of start of the administration target machines M1-Mn, but may be applied for a phase after starting the administration target machines M1-Mn.

As described above, according to the restoration method of the MAC address according to the embodiment, the network communication device holds a permission list (accept list) having a regular first MAC address (D-MAC dm) dynamically assigned to the administration target machine and a second MAC address (U-MAC um) uniquely assigned to the administration target machine for each of the administration target machines, and admits the communication of the frame in which the MAC address included in the permission list is an origin of transmission. In addition, the administration server holds the regular first MAC address corresponding to the second MAC address of the administration target machine. In addition, the restoration method of the MAC address according to the embodiment has a process that the administration target machine sends a first frame (MAC address confirmation frame) in which the first MAC address that the administration target machine holds is an origin of transmission to the administration server and a process that the administration target machine sends a second frame (D-MAC demand frame) in which the second MAC address is an origin of transmission to the administration server when there is not the reply from the administration server for the first frame. Further, the restoration method of the MAC address in the embodiment has a process that the administration server answers a third frame including the authorized (regular) first MAC address corresponding to the second MAC address in response to the second frame and a process that the administration target machine restores the first MAC address to the regular MAC address included in the third frame in response to the third frame and reboots based on the first MAC address after the restoration.

Therefore, it is possible that the administration target machine judges whether the held first MAC address (D-MAC dm) is appropriate based on the presence of the reply from the administration server 10. In addition, the administration target machine determines that the held first MAC address (D-MAC dm) is rewritten when the reply from the administration server is not present, and enables communication with the administration server 10 by using the U-MAC um where the uniqueness is guaranteed temporarily. And the administration target machine acquires the regular first MAC address (D-MAC dm) from the administration server 10 and restores held first MAC address (D-MAC dm) to enable a start based on the appropriate MAC address. That is, the administration target machine temporally uses a second MAC address (the U-MAC um), thereby it is possible to automatically restore a MAC address while avoiding the duplication of the MAC address of the other machines.

In addition, according to the embodiment, the network communication device separates the frame of the MAC address included in the permission list. Therefore, it is possible to restore first MAC address (D-MAC dm) even if the rewritten first MAC address (D-MAC dm) duplicates with the MAC address of other machines without causing influence to the other machines. In other words, it is possible that the administration target machine according to the embodiment restores a MAC address automatically while avoiding the collision of the MAC address with other machines even when the first MAC address (D-MAC dm) is rewritten.

In addition, by the restoration method of the MAC address according to the embodiment, the administration target machine sends the first frame (MAC address confirmation frame) to the administration server at the time of the beginning of start of the administration target machine and starts based on the first MAC address when the administration target machine receives the reply from the administration server for the first frame. And the administration target machine, when there is not the reply from the administration server for the first frame, starts based on second MAC address (U-MAC um) and sends second frame (D-MAC demand frame) to the administration server.

Thereby, the administration target machine according to the embodiment temporally starts based on the second MAC address (U-MAC um). Therefore, it is possible to communicate with the administration server 10 and acquire authorized first MAC address (D-MAC dm) from the administration server 10. And it is possible that the administration target machine restores a MAC address based on the regular first MAC address (D-MAC dm) acquired.

In addition, according to the restoration method of the MAC address in the embodiment, the administration target machine transmits the first and the second frames to the administration server by a broadcast. Therefore, it is possible that the administration target server transmits a frame to the administration server even though the administration target machine does not hold the MAC address of the administration server. In addition, it is possible that the administration target machine transmits a frame to the administration server even though the MAC address of the administration server is changed, because the administration target machine does not have to hold the MAC address of the administration server.

In addition, according to the restoration method of the MAC address in the embodiment, the first MAC address is a virtual MAC address, and the second MAC address is one of the physical MAC address or the virtual MAC address. Therefore, the U-MAC um may be a virtual MAC address assigned logically other than a physical MAC address assigned to the NIC physically when the uniqueness is guaranteed. For example, D-MAC dm is the virtual MAC address that is assigned logically so as not to duplicate in a network.

Second Embodiment

In the first embodiment, the administration target machine holds U-MAC um and D-MAC dm. In contrast, the administration target machine according to the second embodiment holds only U-MAC um. The administration target machine according to the second embodiment restores the MAC address of the administration target machine by acquiring the D-MAC dm from the administration server 10 using U-MAC um temporally at the start.

The hardware constitution and the block diagram of the administration server 10 in the second embodiment are similar to that of the first embodiment. In addition, the administration target machine M1 according to the second embodiment stores only U-MAC um in the non-volatile memory 43 in the block diagram of the administration target machine M1 in the first embodiment in FIG. 8. The block diagram of the administration target machine M1 is similar to that depicted by FIG. 9. The processing of the administration target machine according to the second embodiment will be explained based on a flow chart.

(Process of a Administration Target Machine)

Figure 14:
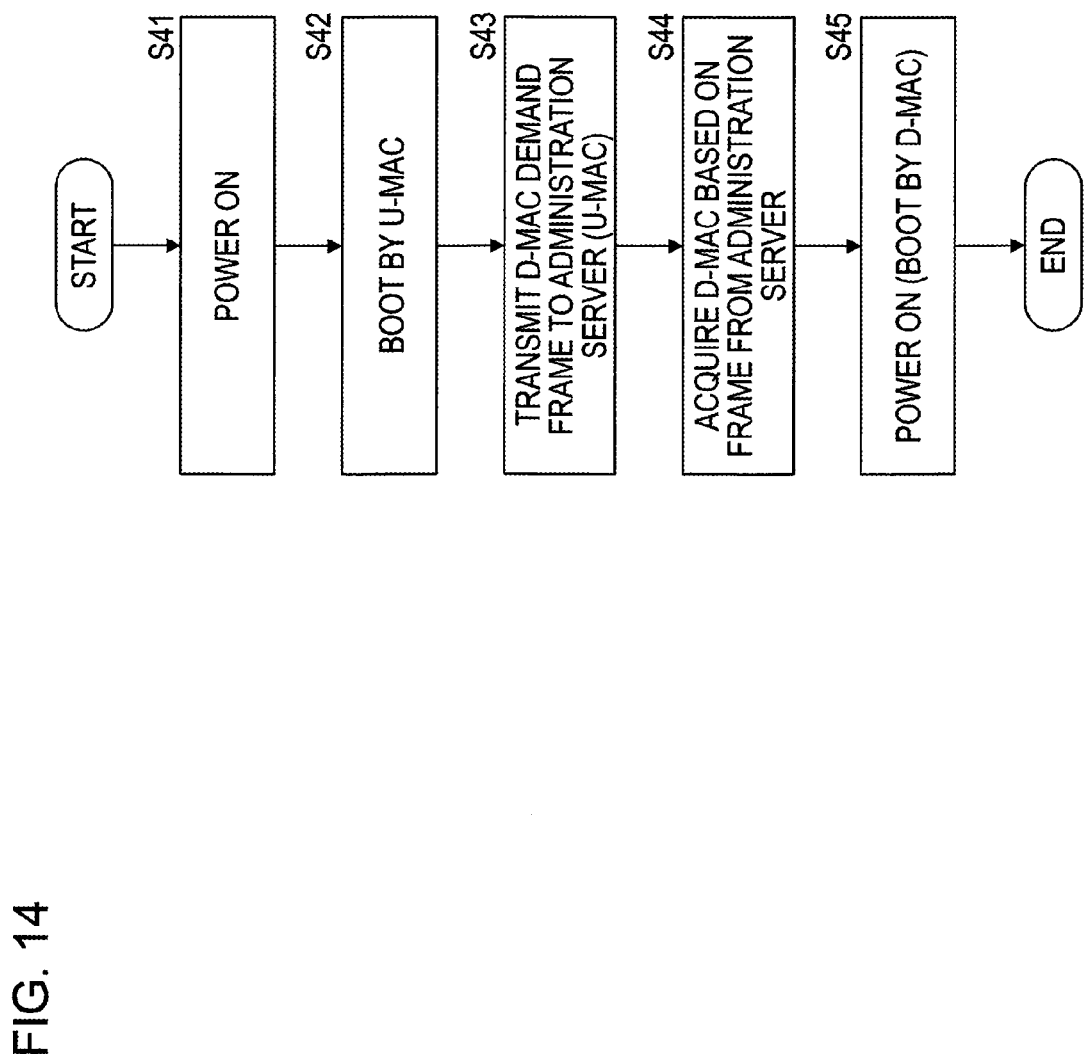
FIG. 14 is a diagram of a flow chart explaining process of the administration target machine M1 according to the second embodiment.

FIG. 14 is a diagram of a flow chart explaining process of the administration target machine M1 according to the second embodiment. As same as the flow chart depicted by FIG. 10, in the flow chart of FIG. 14, the processing of the administration target machine M1 will be explained, but the processing of other administration target machine M2 is similar, too.

Firstly, the administration target machine M1 starts the start process based on the power up of the power supply (S41). In the second embodiment, the MAC address restoration part 52 in the administration target machine M1 starts boot process based on the U-MAC um (S42). The MAC address restoration part 52 in the administration target machine M1 sends a demand frame of the D-MAC dm of the administration target machine M1 that the MAC address of the origin of transmission is the U-MAC um to the administration server 10.

In the second embodiment, the frame reply part 32 in the administration server 10, when receiving the D-MAC demand frame, searches for the D-MAC dm corresponding to the MAC address (U-MAC um) of the origin of transmission that the D-MAC demand frame includes with reference to the physical server management DB d2, as same as the first embodiment (S26 in FIG. 11). Then, the frame reply part 32 in the administration server 10 sends a frame including searched D-MAC dm information to the MAC address (that is, the U-MAC um of the administration target machine M1) of the origin of transmission included in the D-MAC demand frame (S27 in FIG. 11). The flow chart of the administration server 10 in the second embodiment is similar to the flow chart in the first embodiment depicted by FIG. 11 and FIG. 12. But the administration server 10 in the second embodiment does not receive the MAC address confirmation frame from the administration target machine M1.

Returning to the flow chart of FIG. 14, the MAC address restoration part 52 in the administration target machine M1, when receiving the reply frame of the D-MAC demand frame from the administration server 10, acquires the regular D-MAC dm included in the frame (S44). Then, the MAC address restoration part 52 in the administration target machine M1 re-starts (reboots) based on the D-MAC dm which is acquired (S45). Therefore, the MAC address of the administration target machine M1 is restored by an appropriate MAC address even though the administration target machine M1 does not hold the D-MAC dm.

As described above, according to the restoration method of the MAC address according to the embodiment, the network communication device holds a permission list (accept list) having a regular first MAC address (D-MAC dm) dynamically assigned to the administration target machine and a second MAC address (U-MAC um) uniquely assigned to the administration target machine for each of the administration target machines, and admits the communication of the frame in which the MAC address included in the permission list is an origin of transmission. In addition, the administration server holds the regular first MAC address corresponding to the second MAC address of the administration target machine. In addition, the restoration method of the MAC address according to the embodiment has a process that the administration target machine sends a second frame in which the second MAC address is an origin of transmission to the administration server and a process that the administration server answers a third frame including the authorized (regular) first MAC address corresponding to the second MAC address in response to the second frame. Further, the restoration method of the MAC address according to the embodiment has a process that the administration target machine reboots the regular first MAC address included in the third frame in response to the third frame.

Therefore, according to the administration target machine in the embodiment, it is possible that the administration target machine communicates with the administration server 10 by using the second MAC address (U-MAC um) where the uniqueness is guaranteed temporarily, even though the administration target machine does not hold the first MAC address (D-MAC dm). And the administration target machine acquires the regular first MAC address (D-MAC dm) from the administration server 10 and reboots (re-starts) based on the regular first MAC address (D-MAC dm) which acquires, thereby the MAC address is restored. That is, the administration target machine temporally uses the second MAC address (the U-MAC um), thereby it is possible to automatically restore a MAC address while avoiding the duplication of the MAC address of the other machines.

In addition, by the restoration method of the MAC address according to the embodiment, the administration target machine starts based on the second MAC address and sends the second frame to the administration server. Therefore, according to the administration server in the embodiment, by temporally starting based on the second MAC address (U-MAC um) at start, it is possible to communicate with the administration server 10 and acquire authorized first MAC address (D-MAC dm) from the administration server 10. And it is possible that the administration target machine restores a MAC address based on the regular first MAC address (D-MAC dm) acquired.

In addition, according to the restoration method of the MAC address in the embodiment, the administration target machine transmits the second frame to the administration server by a broadcast. Therefore, it is possible that the administration target server according to the embodiment transmits a frame to the administration server even though the administration target machine does not hold the MAC address of the administration server. In addition, it is possible that the administration target machine transmits a frame to the administration server even though the MAC address of the administration server is changed, because the administration target machine does not have to hold the MAC address of the administration server.

In addition, according to the restoration method of the MAC address in the embodiment, the first MAC address is a virtual MAC address, and the second MAC address is one of the physical MAC address or the virtual MAC address. Therefore, the U-MAC um may be a virtual MAC address assigned logically other than a physical MAC address assigned to the NIC physically when the uniqueness is guaranteed. For example, D-MAC dm is the virtual MAC address that is assigned logically so as not to duplicate in a network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method of restoring a MAC address in system that a plurality of administration target machines connects with an administration server through a network communication device, the method comprising:

first transmitting a first frame, in which a origin of a transmission is a first MAC address held in the administration target machine, through the network communication device to the administration server which stores a first MAC address dynamically assigned to the administration target machine corresponding to a second MAC address uniquely assigned to the administration target machine, by the administration target machine, the network communication device admitting a passage of a frame, in which the origin of the transmission is a MAC address included in a permission list which stores the first MAC address and the second MAC address for each of the plurality of administration target machines;

second transmitting a second frame, in which the origin of a transmission is the second MAC address of the administration target machine, through the network communication device to the administration server, when not receiving a reply for the first frame from the administration server, by the administration target machine;

replying a third frame which includes the first MAC address stored in the administration server corresponding to the second MAC address in response to the second frame by the administration server; and restoring the held first MAC address to the first MAC address included in the third frame in response to the third frame and re-booting own administration target machine based on the restored first MAC address by the administration target machine.

2. The method according to claim 1, wherein the first transmitting comprising, transmitting the first frame to the administration server at the time of the beginning of start of the administration target machine; and first booting the administration target machine based on the first MAC address when receiving the reply for the first frame from the administration server, the second transmitting further comprising second booting the administration target machine based on the second MAC address when not receiving the reply for the first frame from the administration server.

3. The method according to claim 1, wherein the first and second transmitting comprising transmitting the first and the second frames by a broadcast.

4. The method according to claim 1, wherein the first MAC address comprising a virtual MAC address, and the second MAC address comprising one of a physical MAC address and a virtual MAC address.

5. A method of restoring a MAC address in system that a plurality of administration target machines connects with an administration server through a network communication device, the method comprising:

transmitting a second frame, in which a origin of a transmission is a second MAC address of the administration target machine, through the network communication device to the administration server which stores a first MAC address dynamically assigned to the administration target machine corresponding to the second MAC address uniquely assigned to the administration target machine, by the administration target machine, the network communication device admitting a passage of a frame, in which the origin of the transmission is a MAC address included in a permission list which stores the first MAC address and the second MAC address for each of the plurality of administration target machines;

replying a third frame which includes the first MAC address stored in the administration server corresponding to the second MAC address in response to the second frame by the administration server; and re-booting own administration target machine based on the first MAC address included in the third frame in response to the third frame by the administration target machine.

6. The method according to claim 5, the transmitting comprising:

booting the administration target machine based on the second MAC address; and transmitting the second frame to the administration server.

7. The method according to claim 5, wherein the transmitting comprising transmitting the second frame by a broadcast.

8. The method according to claim 5, wherein the first MAC address comprising a virtual MAC address, and the second MAC address comprising one of a physical MAC address and a virtual MAC address.

9. A computer-readable non-transitory tangible recording medium having stored therein a program for causing a computer to execute a process for restoring a MAC address in system that a plurality of administration target machines connects with an administration server through a network communication device, the process comprising:
first transmitting a first frame, in which a origin of a transmission is a first MAC address held in the administration target machine, through the network communication device to the administration server which stores a first MAC address dynamically assigned to the administration target machine corresponding to a second MAC address uniquely assigned to the administration target machine, by the administration target machine, the network communication device admitting a passage of a frame, in which the origin of the transmission is a MAC address included in a permission list which stores the first MAC address and the second MAC address for each of the plurality of administration target machines;
second transmitting a second frame, in which the origin of a transmission is the second MAC address of the administration target machine, through the network communication device to the administration server, when not receiving a reply for the first frame from the administration server, by the administration target machine;
replying a third frame which includes the first MAC address stored in the administration server corresponding to the second MAC address in response to the second frame by the administration server; and
restoring the held first MAC address to the first MAC address included in the third frame in response to the third frame and re-booting own administration target machine based on the restored first MAC address by the administration target machine.

10. The computer-readable non-transitory tangible recording medium according to claim 9, wherein the first transmitting comprising,
transmitting the first frame to the administration server at the time of the beginning of start of the administration target machine; and
first booting the administration target machine based on the first MAC address when receiving the reply for the first frame from the administration server,
the second transmitting further comprising second booting the administration target machine based on the second MAC address when not receiving the reply for the first frame from the administration server.

11. The computer-readable non-transitory tangible recording medium according to claim 9, wherein the first and second transmitting comprising transmitting the first and the second frames by a broadcast.

12. The computer-readable non-transitory tangible recording medium according to claim 9, wherein the first MAC address comprising a virtual MAC address, and
the second MAC address comprising one of a physical MAC address and a virtual MAC address.

13. A computer-readable non-transitory tangible recording medium having stored therein a program for causing a computer to execute a process for restoring a MAC address in system that a plurality of administration target machines connects with an administration server through a network communication device, the process comprising:
transmitting a second frame, in which a origin of a transmission is a second MAC address of the administration target machine, through the network communication device to the administration server which stores a first MAC address dynamically assigned to the administration target machine corresponding to the second MAC address uniquely assigned to the administration target machine, by the administration target machine, the network communication device admitting a passage of a frame, in which the origin of the transmission is a MAC address included in a permission list which stores the first MAC address and the second MAC address for each of the plurality of administration target machines;
replying a third frame which includes the first MAC address stored in the administration server corresponding to the second MAC address in response to the second frame by the administration server; and
re-booting own administration target machine based on the first MAC address included in the third frame in response to the third frame by the administration target machine.

14. The computer-readable non-transitory tangible recording medium according to claim 13, the transmitting comprising:
booting the administration target machine based on the second MAC address; and
transmitting the second frame to the administration server.

15. The computer-readable non-transitory tangible recording medium according to claim 13, wherein the transmitting comprising transmitting the second frame by a broadcast.

16. The computer-readable non-transitory tangible recording medium according to claim 13, wherein the first MAC address comprising a virtual MAC address, and
the second MAC address comprising one of a physical MAC address and a virtual MAC address.

* * * * *